US012400587B1

(12) United States Patent
Lo et al.

(10) Patent No.: US 12,400,587 B1
(45) Date of Patent: Aug. 26, 2025

(54) PIXEL DRIVING CIRCUIT AND MICRO DISPLAY PANEL

(71) Applicant: PlayNitride Display Co., Ltd., Miaoli County (TW)

(72) Inventors: Cheng-Chi Lo, Miaoli County (TW); Hoong-Lien Lai, Miaoli County (TW)

(73) Assignee: PlayNitride Display Co., Ltd., Miaoli County (TW)

( * ) Notice: Subject to any disclaimer, the term of this patent is extended or adjusted under 35 U.S.C. 154(b) by 0 days.

(21) Appl. No.: 18/925,567

(22) Filed: Oct. 24, 2024

(30) Foreign Application Priority Data

Sep. 20, 2024 (TW) ................................ 113135602

(51) Int. Cl.
*G09G 3/32* (2016.01)

(52) U.S. Cl.
CPC ....... *G09G 3/32* (2013.01); *G09G 2300/0842* (2013.01); *G09G 2320/0233* (2013.01); *G09G 2330/08* (2013.01)

(58) Field of Classification Search
CPC ............. G09G 3/32; G09G 2300/0842; G09G 2320/0233; G09G 2330/08
See application file for complete search history.

(56) References Cited

U.S. PATENT DOCUMENTS

| | | | | |
|---|---|---|---|---|
| 2016/0217735 | A1* | 7/2016 | Park | G09G 3/2003 |
| 2018/0033373 | A1* | 2/2018 | Hong | G09G 3/3233 |
| 2019/0080970 | A1* | 3/2019 | Chaji | G09G 3/2014 |
| 2019/0103456 | A1* | 4/2019 | Choi | H10K 59/131 |
| 2023/0169921 | A1* | 6/2023 | Kim | G09G 3/3233 345/204 |

* cited by examiner

*Primary Examiner* — Andrew Sasinowski
(74) *Attorney, Agent, or Firm* — MUNCY, GEISSLER, OLDS & LOWE, P.C.

(57) ABSTRACT

A pixel driving circuit and a micro display panel are disclosed. A repair switch is in at least one sub-pixel circuit unit of each pixel driving circuit unit. A controlling unit controls the repair switch to turn on or off. When a micro-LED of the at least one sub-pixel, which the current flows through, illuminates during a non-driving period, the controlling unit controls the repair switch to interrupt the current. Therefore, the micro-LED of the at least one sub-pixel does not illuminate during the non-driving period and a light spot or light line issue is solved.

20 Claims, 7 Drawing Sheets

PIXEL DRIVING CIRCUIT AND MICRO DISPLAY PANEL

CROSS-REFERENCE TO RELATED APPLICATIONS

This application is based upon and claims priority under 35 U.S.C. 119 from Taiwan Patent Application No. 113135602 filed on Sep. 20, 2024, which is hereby specifically incorporated herein by this reference thereto.

BACKGROUND OF THE INVENTION

1. Field of the Invention

The present invention is related to a pixel driving circuit, and more particularly to a pixel driving circuit with a light spot repair capability for a micro display panel.

2. Description of the Prior Arts

Recently, the head-mounted displays proposed on the market are terminal products for realizing virtual reality (VR). During use, the user wears the head-mounted display directly on his or her head and a display panel thereof is close to the focus of the user's eyes.

To have a good viewing experience when the user wears the head-mounted display for virtual reality (VR), the display panel of the head-mounted display must have high brightness, small size, low power consumption, etc. characteristics. Currently, a micro display panel that integrates micro light-emitting diodes (hereinafter micro-LEDs) on a silicon-based backplane can fully meet these characteristic requirements.

Since the micro display panel is made of micro-level micro-LEDs directly formed on a semiconductor wafer with a driving integrated circuit, if a light spot or light line occurs, it needs to be repaired. Furthermore, the operation of light spot repair must be accurately controlled; it damages other good pixels surrounding the light spot or light line. Therefore, a better light spot repair solution must be required to solve the light spot or light line of the micro display panel when it is leaving the factory.

To overcome the shortcomings, the present invention provides a pixel driving circuit and micro display panel to mitigate or to obviate the aforementioned problems.

SUMMARY OF THE INVENTION

The objective of the present invention is to provide a pixel driving circuit and a micro display panel.

To achieve the foregoing objective, the pixel driving circuit has:

a plurality of pixel driving circuit units, each of which has at least one sub-pixel circuit unit, wherein each of the at least one sub-pixel circuit unit is adapted to be electrically connected to a micro-LED of a sub-pixel, and during a driving period, the micro-LED corresponding to the sub-pixel circuit unit is driven to illuminate, wherein each sub-pixel circuit unit has a repair switch; and a controlling unit electrically connected to the repair switch of each of the at least one sub-pixel circuit unit, wherein when a current flows through the micro-LED of the at least one sub-pixel to light it up during a non-driving period, the controlling unit controls the repair switch to interrupt the current so as not to light up the micro-LED of the at least one sub-pixel up during the non-driving period.

Based on the foregoing description, the pixel driving circuit of the present invention mainly provides a repair switch in the at least one sub-pixel circuit unit of each pixel driving circuit unit and controls the repair switch by the controlling unit. When the micro-LED of the at least one sub-pixel, which the current flows through, lights up during the non-driving period, the controlling unit controls the repair switch to interrupt the current so as not to light up the micro-LED of the at least one sub-pixel during the non-driving period. Therefore, a light spot or light line issue is solved.

To achieve the foregoing objective, the micro display panel has:

a plurality of pixels, each of which has at least one sub-pixel, wherein each of the least one sub-pixel has a micro-LED; and the pixel driving circuit as mentioned above.

Based on the foregoing description, in the micro display panel of the present invention, the pixel driving circuit is electrically connected to the pixels and drives the pixels to illuminate during the driving period. The micro display panel of the present invention mainly provides a repair switch in the at least one sub-pixel circuit unit of each pixel driving circuit unit and controls the repair switch by the controlling unit. When the micro-LED of the at least one sub-pixel, which the current flows through, illuminates during the non-driving period, the controlling unit controls the repair switch to interrupt the current so as not to light up the micro-LED of the at least one sub-pixel during the non-driving period. Therefore, a light spot or light line issue is solved.

Other objectives, advantages and novel features of the invention will become more apparent from the following detailed description when taken in conjunction with the accompanying drawings.

DETAILED DESCRIPTION OF THE EMBODIMENTS

The present invention provides a pixel driving circuit of a micro display panel. With embodiments and drawings thereof, the features of the present invention are described in detail as follows.

Figure 1A:
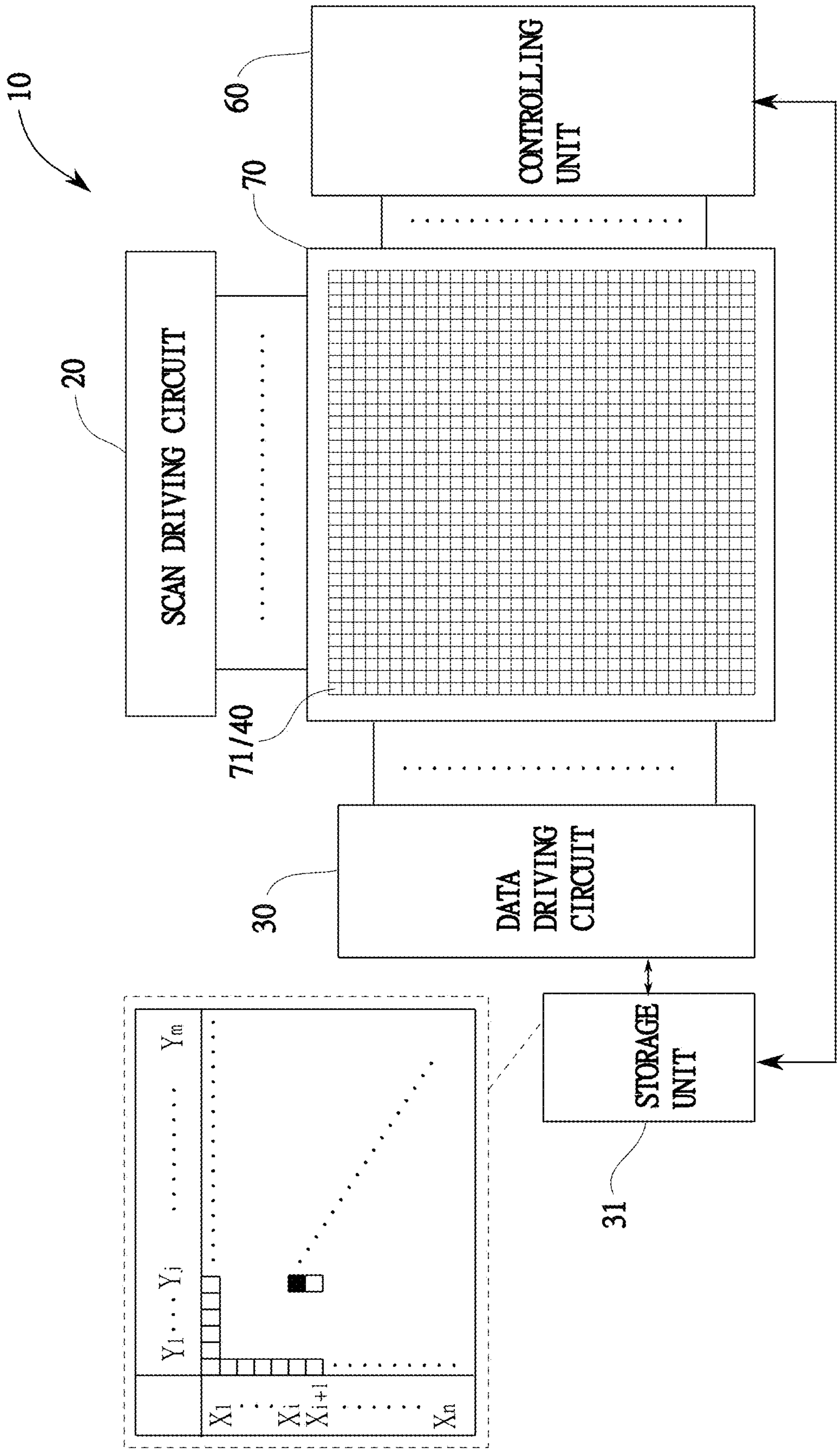
FIG. 1A is a schematic circuit diagram of a pixel driving circuit with a light spot repair capability of a micro display panel in accordance with the present invention.

With reference to FIG. 1A, a schematic circuit diagram of a pixel driving circuit 10 with a light spot repair capability of a micro display panel 70 in accordance with the present invention is shown. The pixel driving circuit 10 with the light spot repair capability has a scan driving circuit 20, a data driving circuit 30, a plurality of pixel driving circuit units 40, a plurality of repair switches 50 and a controlling unit 60. In the present embodiment, the pixel driving circuit of the present invention is applied in the micro display panel (also known as Micro Display), which is made of a plurality of micro-level micro-LEDs and a silicon backplane. The silicon backplane uses a semiconductor process to integrate various circuit components, such as complementary metal oxide semiconductor thin film transistors (CMOS TFT), on a semiconductor wafer. The micro-LEDs are transferred to and mounted on the silicon backplane to form the micro display panel.

In the present embodiment, the pixel driving circuit units 40 are electrically connected to the scan driving circuit 20 and the data driving circuit 30. The data driving circuit 30 is electrically connected to a storage unit 31, such as a flash memory.

Figure 2:
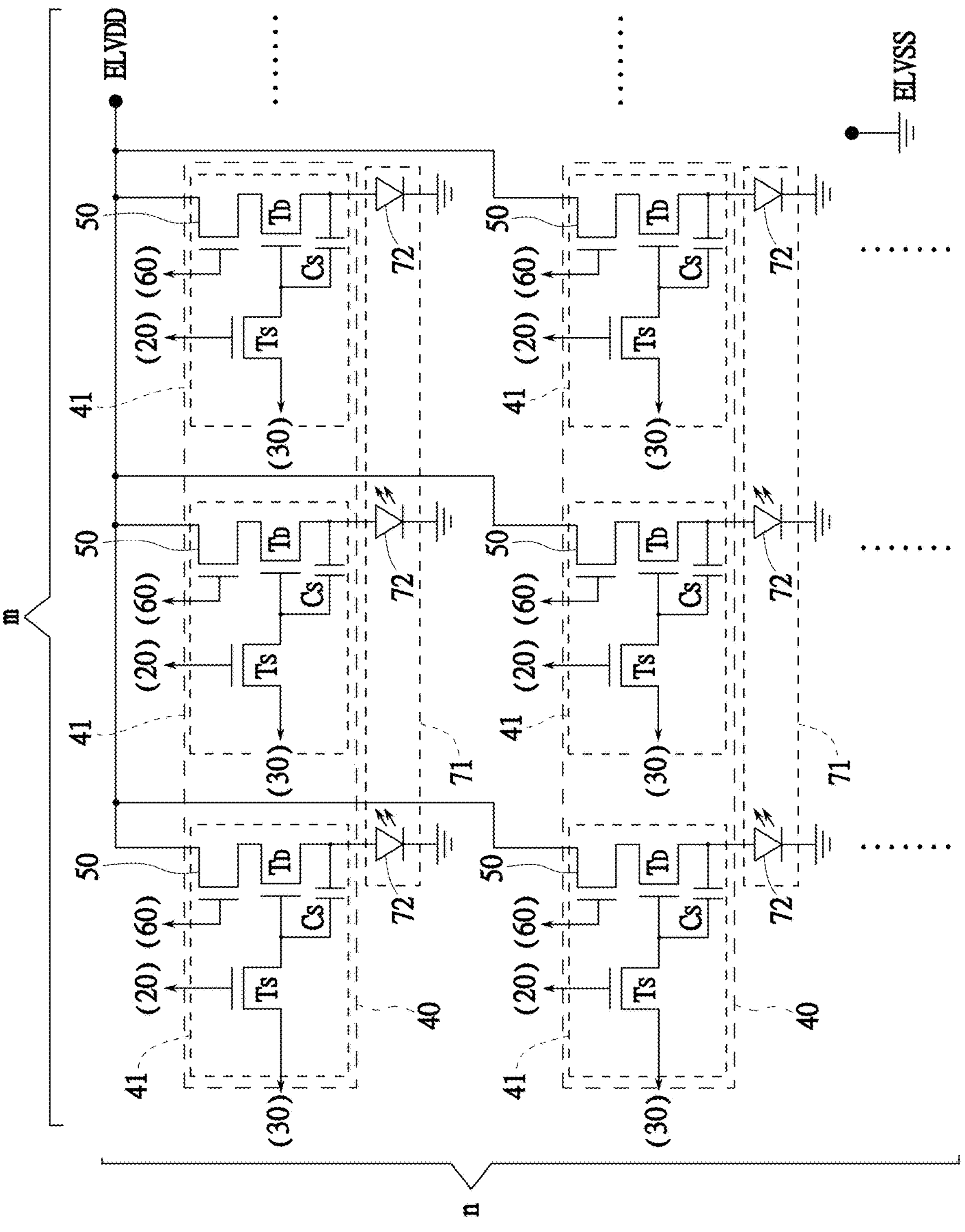
FIG. 2 is a partial circuit diagram of a first embodiment of a pixel driving circuit with a light spot repair capability of a micro display panel in accordance with the present invention.

With further reference to FIG. 2, each pixel driving circuit unit 40 has at least one sub-pixel circuit unit 41. In the present embodiment, each pixel driving circuit unit 40 has three sub-pixel circuit unit 41 and the three sub-pixel circuit units 41 are respectively and electrically connected to three sub-pixels 72. The three sub-pixels 72 consist of three micro-LEDs with different light colors (such as red, green, and blue) to form one pixel of the micro display panel 70, but not limited to. During a driving period, the scan driving circuit 20 sequentially enables the sub-pixel circuit units 41, and the data driving circuit 30 outputs a grayscale value corresponding to an image to the enabled sub-pixel circuit unit 41 to drive the micro-LEDs electrically connected to the sub-pixel circuit unit 41 to illuminate.

Figure 3A:
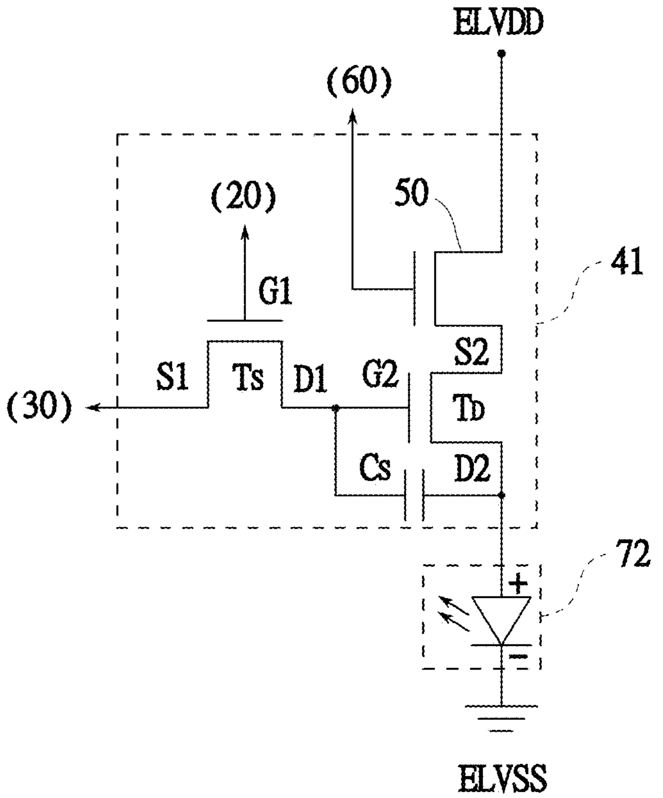
FIG. 3A is a partial circuit diagram of FIG. 2.

With further reference to FIG. 3A, each sub-pixel circuit unit 41 mainly has a switching transistor $T_S$, a driving transistor $T_D$, and a storage capacitor $C_S$. The storage capacitor $C_S$ is electrically connected between a first drain D1 of the switching transistor $T_S$ and a second drain D2 of the driving transistor $T_D$. The switching transistor $T_S$ and the driving transistor $T_D$ are MOSFETs. A first gate G1 of the switching transistor $T_S$ is electrically connected to the scan driving circuit 20, a first source S1 of the switching transistor $T_S$ is electrically connected to the data driving circuit 30 and the first drain D1 is electrically connected to a second gate G2 of the driving transistor $T_D$. A second source S2 of the driving transistor $T_D$, the second drain D2 of the driving transistor $T_D$, and the micro-LED of the corresponding sub-pixel 72 are respectively and electrically connected to a high potential terminal ELVDD and a low potential terminal ELVSS of a system power. Therefore, when the driving transistor $T_D$ is driven to turn on, the micro-LED of the sub-pixel 72 and the system power establish a current loop and a current flows through the micro-LED of the sub-pixel 72 to illuminate.

Figure 3B:
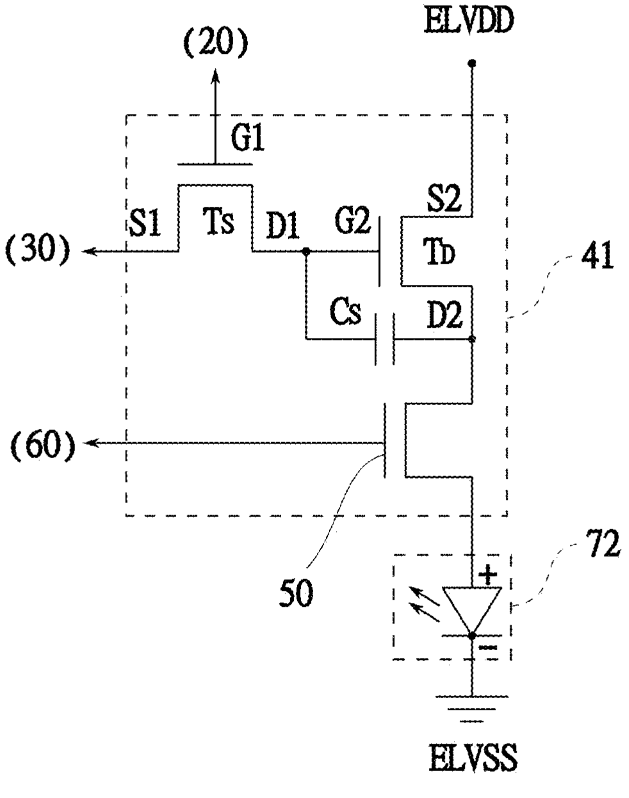
FIG. 3B is a partial circuit diagram of a second embodiment of a pixel driving circuit with a light spot repair capability of a micro display panel in accordance with the present invention.
Figure 4A:
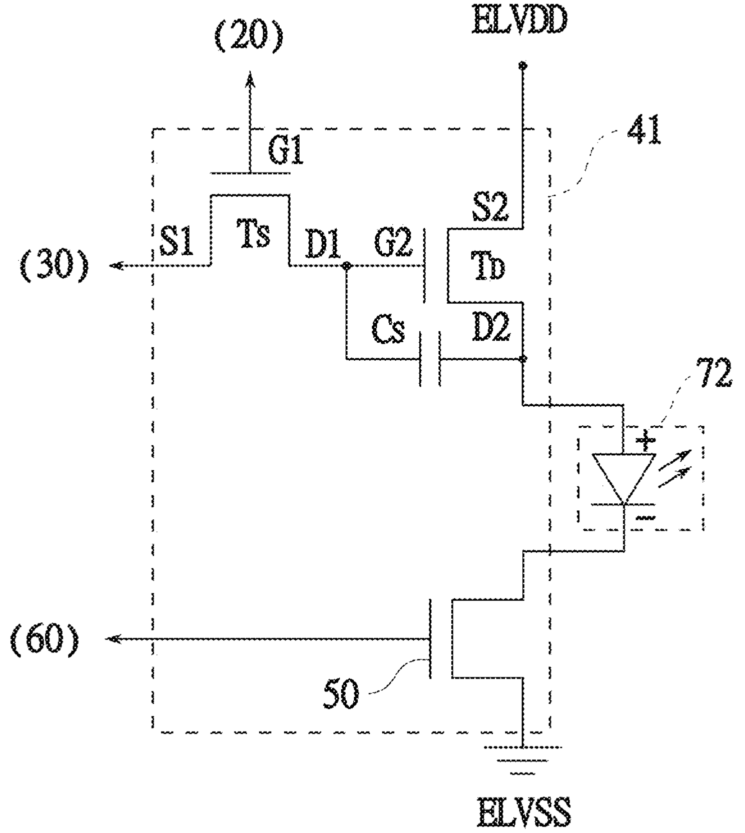
FIG. 4A is a partial circuit diagram of a third embodiment of a pixel driving circuit with a light spot repair capability of a micro display panel in accordance with the present invention.
Figure 4B:
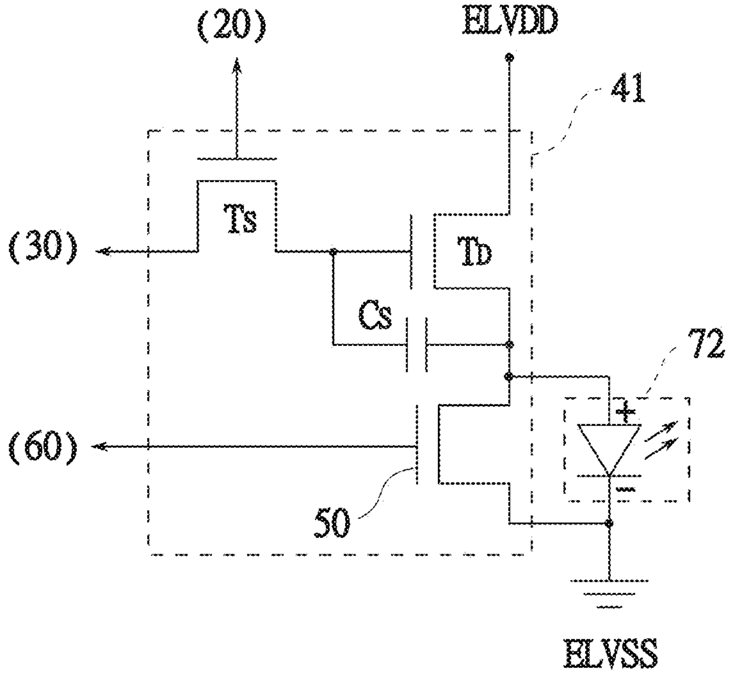
FIG. 4B is a partial circuit diagram of a fourth embodiment of a pixel driving circuit with a light spot repair capability of a micro display panel in accordance with the present invention.

With reference to FIGS. 2 and 3A, the repair switches 50 are respectively in the sub-pixel circuit units 41. In one embodiment, each repair switch 50 may be a transistor, a one-time programmable component, or any switching element that can be implemented on a semiconductor wafer. When a high enough voltage is applied to the one-time programmable component, it will break down to form a permanent conductive path, and its state will be changed forever. Thus, it is called a one-time programming component. In the present embodiment, each repair transistor is a NMOS TFT and is electrically connected between the high potential terminal ELVDD and the second source S2 of the driving transistor $T_D$ in serial. When a voltage is applied to the NMOS TFT, and a voltage difference ($V_{GS}$) between the first gate G1 and the first source S1 of the NMOS TFT is larger than a threshold voltage ($V_{th}$) of NMOS TFT ($V_{GS}>V_{th}$), a conductive path is established. At the same time, when a voltage difference voltage ($V_{DS}$) between the first source S1 and the first drain D1 is formed, a current of the NMOS TFT flows through the conductive path from the first source S1 to the first drain D1. Therefore, the NMOS TFT is in a turn-on state. In addition, each repair transistor may be a PMOS TFT, too. When the driving transistor $T_D$ and the repair switch 50 turn on together, the micro-LED of the sub-pixel 72 and the system power establish the current loop to light the micro-LED up. In addition, as shown in FIG. 3B, each repair switch 50 may be electrically connected between the second drain D2 of the driving transistor $T_D$ and an anode (+) of the micro-LED of the corresponding sub-pixel 72 in serial. In FIG. 4A, each repair switch 50 may be electrically connected between the low potential terminal ELVSS of the system power and a cathode (−) of the micro-LED of the corresponding sub-pixel 72 in serial. As shown in FIG. 4B, each repair switch 50 may be electrically connected to the micro-LED of the corresponding sub-pixel 72 in parallel. In this case, when the repair switch 50 turns on, the current of the micro-LED of the corresponding sub-pixel 72 will be bypassed by the repair switch 50 and the micro-LED of the corresponding sub-pixel 72 does not illuminate. That is, when the repair switch 50 turns off and the driving transistor $T_D$ turns on, the micro-LED of the sub-pixel 72 illuminates.

With reference to FIGS. 1A and 2, the controlling unit 60 is electrically connected to the repair switches 50 and controls each repair switch 50 to turn on or off. The sub-pixels of the micro display panel 70 are arranged in n×m matrix and are checked to determine whether any light spot or light line occurs before leaving the factory. That is, the micro-LED of a single sub-pixel 72 that illuminates by the current flowing during the non-driving period is called the light spot. The micro-LEDs of the adjacent sub-pixels 72 that illuminate by current flowing during the non-driving period are called light lines. In the present embodiment, the storage unit 31 stores a coordinate (X, Y) of each sub-pixel with a light spot or light line of the micro display panel 70. The Demura detection method can be used here. That is, after taking a picture of the micro display panel with a charge-coupled device (CCD) of Demura detection equipment, the light spots are extracted from the picture. Demura detection method applies to all maintenance tasks. The present invention uses Demura detection method to detect the coordinates of the light spots/light lines. The controlling unit 60 is electrically connected to the storage unit 31. During the driving period, when the scan driving circuit 20 and the data driving circuit 30 drive the micro-LED of the sub-pixel with the light spot 72 by the sub-pixel circuit unit 41, the controlling unit 60 reads the coordinate (X, Y) of the sub-pixel with the light spot stored in the storage unit 31. The controlling unit 60 synchronously controls the repair switch 50 of the sub-pixel circuit unit 41 to turn off. Therefore, the micro-LED of the sub-pixel with the light spot turns off and does not illuminate and the light spot issue is solved.

Figure 5:
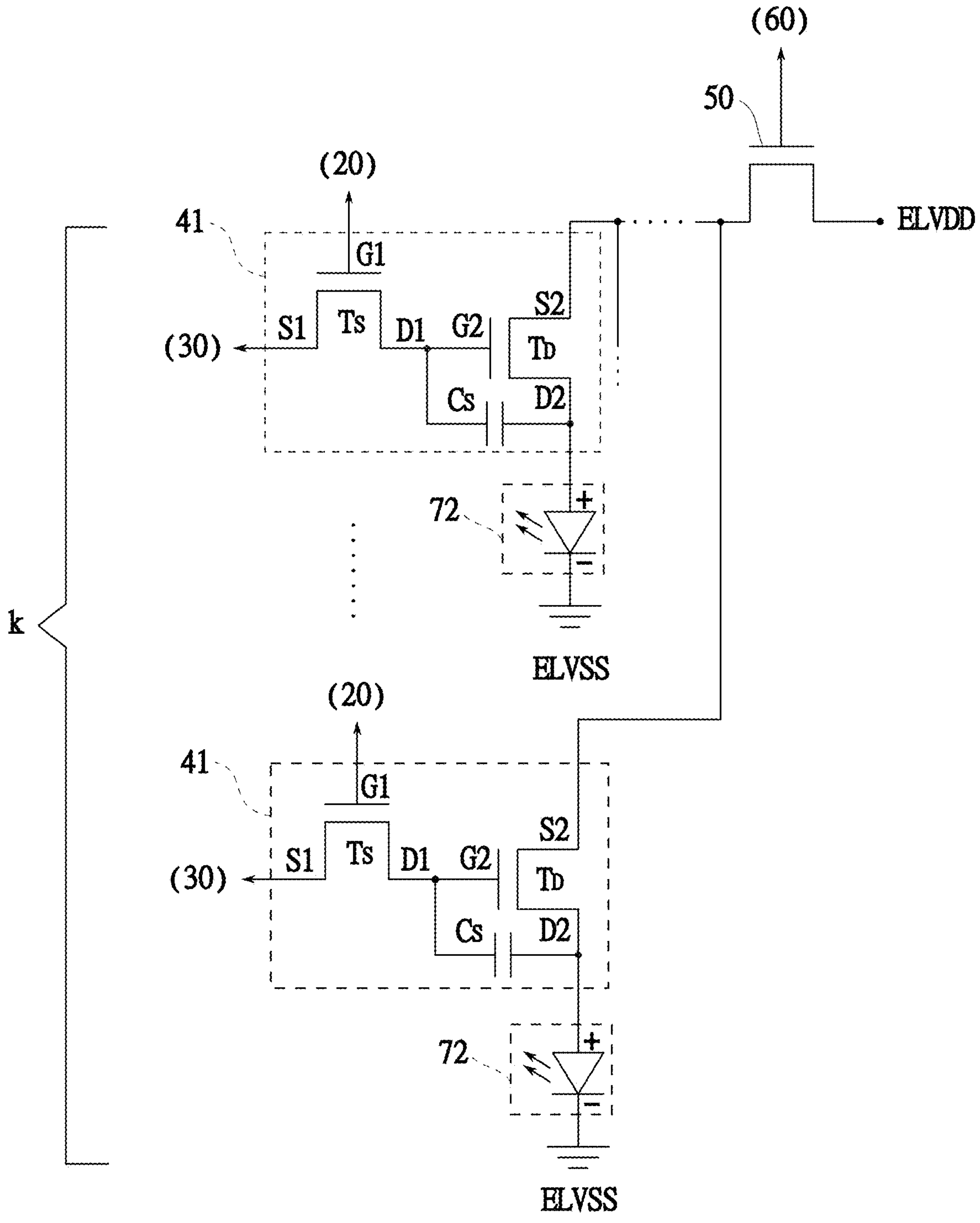
FIG. 5 is a partial circuit diagram of a fifth embodiment of a pixel driving circuit with a light spot repair capability of a micro display panel in accordance with the present invention.

Furthermore, with reference to FIGS. 1A and 5, in one embodiment, the repair switches in the adjacent k sub-pixel circuit units 41 may be integrated into one repair switch 50, wherein k is not larger than n. In another embodiment, the adjacent sub-pixel circuit units 41 on each column of the micro display panel in n×m matrix commonly uses one repair switch 50. Particularly, the repair switch 50 is electrically connected between the high potential terminal ELVDD of the system power and the second sources S2 of the driving transistors $T_D$ in serial. During the non-driving period, the micro-LEDs of the adjacent sub-pixels 72 illuminate to form the light line. During the driving period, according to the coordinates of the sub-pixels with the light spot stored in the storage unit 31, the controlling unit 60 synchronously controls the corresponding repair switch 50 to turn off. Therefore, the micro-LEDs of the adjacent sub-pixels turn off and do not illuminate to solve the light spot and/or light line issue.

Figure 1B:
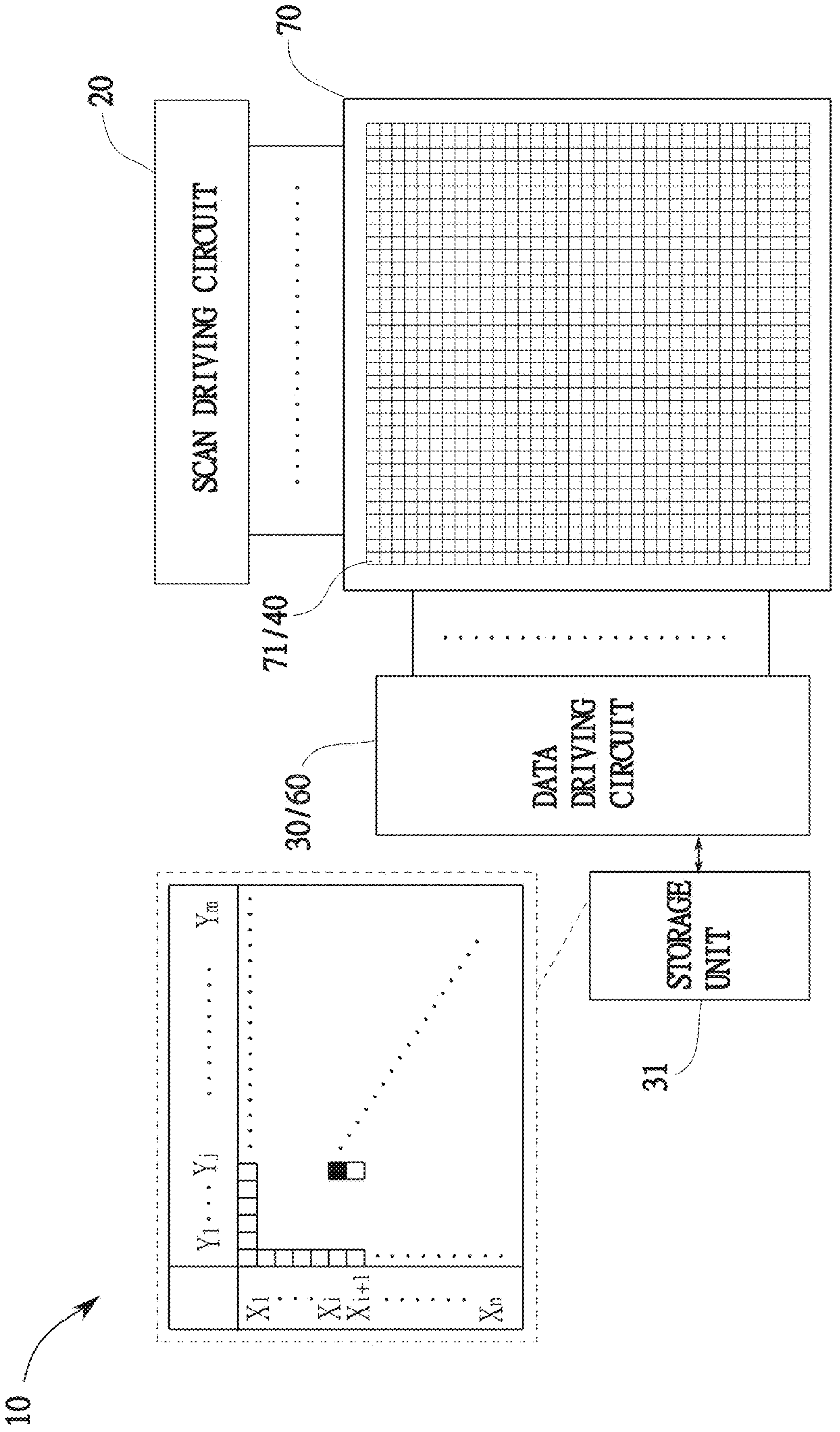
FIG. 1B is another schematic circuit diagram of a pixel driving circuit with a light spot repair capability of a micro display panel in accordance with the present invention.
Figure 6:
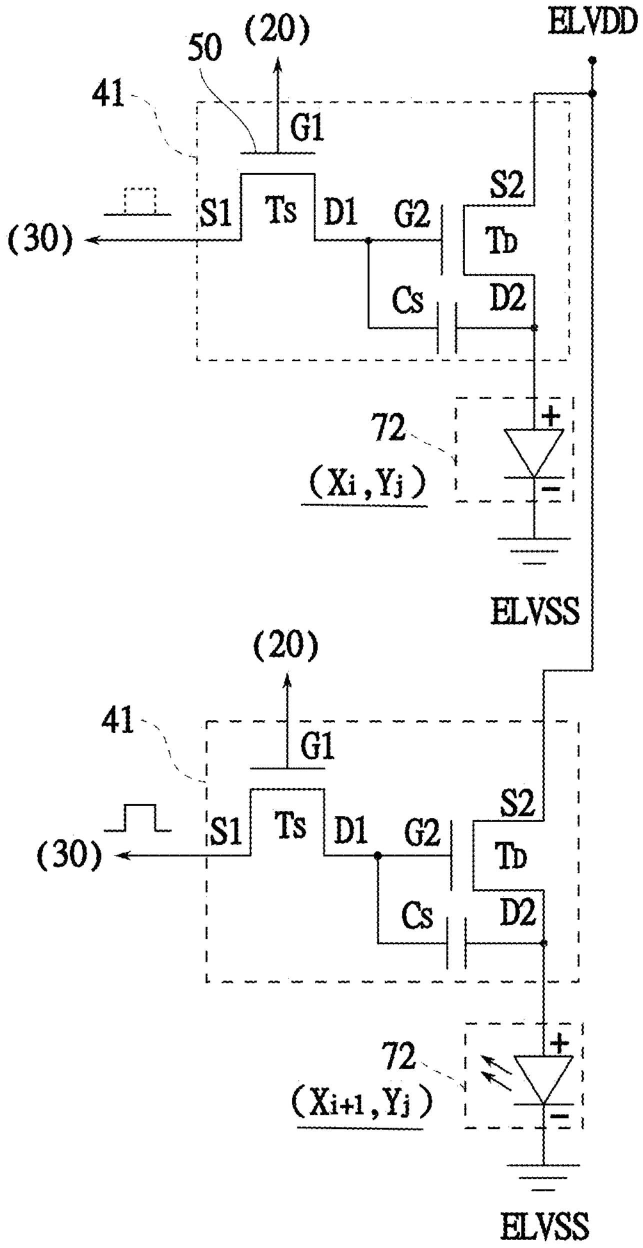
FIG. 6 is a partial circuit diagram of a sixth embodiment of a pixel driving circuit with a light spot repair capability of a micro display panel in accordance with the present invention.

With reference to FIGS. 1B and 6, another schematic circuit diagram of a pixel driving circuit 10 with the light spot repair capability of a micro display panel 70 is shown and is similar to that of FIG. 1A. In present embodiment, a controlling unit 60 is integrated into a data driving circuit 30 and a switching transistor $T_S$ of each sub-pixel circuit unit 41 is used as a repair switch 50. In addition, since a storage unit 31 stores a coordinate (X, Y) of each sub-pixel with the light spot or light line of the micro display panel 70, the data driving circuit 30 reads the coordinates of the sub-pixels with the light spot or light line and then amends an original gray level value of each of the read coordinates to zero gray value before outputting a frame of image data.

During a driving period, when the scan driving circuit 20 output a conductive voltage to the first gate G1 of the switching transistor $T_S$ of the sub-pixel circuit unit 41 with the light spot or light line, the switching transistor $T_S$ turns on, but since the first source S1 receives the zero gray level value from the data driving circuit 30, the second gate G2 of the driving transistor $T_D$ is not driven to turn on the driving transistor $T_D$. Therefore, the micro-LED of the sub-pixel 72 with the light spot and the system power does not establish the current loop, so the current flowing through the micro-LED of the sub-pixel 72 is interrupted and the micro-LED of the sub-pixel 72 does not illuminate. The light spot issue is solved.

Based on the foregoing description, in the micro display panel of the present invention, the pixel driving circuit is electrically connected to the pixels and drives the pixels to illuminate during the driving period. The micro display panel of the present invention mainly provides a repair switch in the at least one sub-pixel circuit unit of each pixel driving circuit unit and controls the repair switch by the controlling unit. When the micro-LED of the at least one sub-pixel, which the current flows through, illuminates during the non-driving period, the controlling unit controls the repair switch to interrupt the current so as not to light up the micro-LED of the at least one sub-pixel during the non-driving period. Therefore, a light spot or light line issue is solved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pixel driving circuit, comprising:

a plurality of pixel driving circuit units, each of which has at least one sub-pixel circuit unit, wherein each of the at least one sub-pixel circuit unit is adapted to be electrically connected to a micro-LED of a sub-pixel, and during a driving period, the micro-LED corresponding to the sub-pixel circuit unit is driven to illuminate, wherein each sub-pixel circuit unit has a repair switch; and a controlling unit electrically connected to the repair switch of each of the at least one sub-pixel circuit unit, wherein when a current flows through the micro-LED of the at least one sub-pixel to light it up during a non-driving period, the controlling unit controls the repair switch to interrupt the current so as not to light up the micro-LED of the at least one sub-pixel up during the non-driving period.

2. The pixel driving circuit as claimed in claim 1, wherein each of the least one sub-pixel circuit unit further comprises:

a switching transistor having a first gate, a first source and a first drain;

a driving transistor having a second gate, a second source and a second drain, wherein the second gate is electrically connected to the first drain of the switching transistor, and the second source, the second drain and the corresponding micro-LED are respectively connected to a high potential terminal and a low potential terminal of a system power; and a storage capacitor electrically connected between the first drain of the switching transistor and the second drain of the driving transistor.

3. The pixel driving circuit as claimed in claim 2, further comprising:

a scan driving circuit electrically connected to the first gate of the switching transistor of the least one sub-pixel circuit unit of each pixel driving circuit unit; and a data driving circuit electrically connected to the first source of the switching transistor of the least one sub-pixel circuit unit of the each pixel driving circuit unit and having the controlling unit and a storage unit, wherein the storage unit stores a coordinate of the sub-pixel that has the micro-LED which the current flows through illuminates during the non-driving period; and the switching transistor of each of the least one sub-pixel circuit unit used as the repair switch, wherein before outputting a frame of image data, the data driving circuit reads the coordinates of the sub-pixels from the storage unit and then amends an original gray level value of each of the read coordinates to zero gray value; and during a driving period, when the scan driving circuit outputs a conductive voltage to the first gate of the switching transistor of the sub-pixel circuit unit and the first source receives the zero gray level value from the data driving circuit, the driving transistor is not driven to turn on, the current flowing through the micro-LED of the sub-pixel is interrupted and the micro-LED of the sub-pixel does not illuminate.

4. The pixel driving circuit as claimed in claim 2, wherein each repair switch is electrically connected between the high potential terminal of the system power and the second source of the driving transistor in serial.

5. The pixel driving circuit as claimed in claim 4, wherein the repair switches of the k adjacent sub-pixel circuit units are further integrated into a single repair switch.

6. The pixel driving circuit as claimed in claim 5, wherein the sub-pixels are arranged in a n×m matrix and k is not larger than n.

7. The pixel driving circuit as claimed in claim 2, wherein each repair switch is electrically connected between the second drain of the driving transistor and an anode of the micro-LED of the corresponding sub-pixel in serial; or each repair switch is electrically connected between the low potential terminal of the system power and a cathode of the micro-LED of the corresponding sub-pixel.

8. The pixel driving circuit as claimed in claim 2, wherein each repair switch is electrically connected to the corresponding micro-LED in parallel.

9. The pixel driving circuit as claimed in claim 4, wherein the repair switch is a transistor or a one-time programmable component.

10. The pixel driving circuit as claimed in claim 5, wherein the repair switch is a transistor or a one-time programmable component.

11. The pixel driving circuit as claimed in claim 6, wherein the repair switch is a transistor or a one-time programmable component.

12. The pixel driving circuit as claimed in claim 7, wherein the repair switch is a transistor or a one-time programmable component.

13. The pixel driving circuit as claimed in claim 8, wherein the repair switch is a transistor or a one-time programmable component.

14. A micro display panel, comprising:

a plurality of pixels, each of which has at least one sub-pixel, wherein each of the least one sub-pixel has a micro-LED; and a pixel driving circuit as claimed in claim 1.

15. The micro display panel as claimed in claim 14, wherein each of the least one sub-pixel circuit unit further comprises:

a switching transistor having a first gate, a first source and a first drain;

a driving transistor having a second gate, a second source and a second drain, wherein the second gate is electrically connected to the first drain of the switching transistor, and the second source, the second drain and the corresponding micro-LED are respectively connected to a high potential terminal and a low potential terminal of a system power; and a storage capacitor electrically connected between the first drain of the switching transistor and the second drain of the driving transistor.

16. The pixel driving circuit as claimed in claim 15, further comprising:

a scan driving circuit electrically connected to the first gate of the switching transistor of the least one sub-pixel circuit unit of each pixel driving circuit unit; and a data driving circuit electrically connected to the first source of the switching transistor of the least one sub-pixel circuit unit of the each pixel driving circuit unit and having the controlling unit and a storage unit, wherein the storage unit stores a coordinate of the sub-pixel that has the micro-LED which the current flows through illuminates during the non-driving period; and the switching transistor of each of the least one sub-pixel circuit unit used as the repair switch, wherein before outputting a frame of image data, the data driving circuit reads the coordinates of the sub-pixels from the storage unit and then amends an original gray level value of each of the read coordinates to zero gray value; and during a driving period, when the scan driving circuit outputs a conductive voltage to the first gate of the switching transistor of the sub-pixel circuit unit and the first source receives the zero gray level value from the data driving circuit, the driving transistor is not driven to turn on, the current flowing through the micro-LED of the sub-pixel is interrupted and the micro-LED of the sub-pixel does not illuminate.

17. The micro display panel as claimed in claim 15, wherein each repair switch is electrically connected between the high potential terminal of the system power and the second source of the driving transistor in serial.

18. The micro display panel as claimed in claim 17, wherein the repair switches of the k adjacent sub-pixel circuit units are further integrated into a single repair switch.

19. The micro display panel as claimed in claim 18, wherein the sub-pixels are arranged in a n×m matrix and k is not larger than n.

20. The micro display panel as claimed in claim 15, wherein each repair switch is electrically connected between the second drain of the driving transistor and an anode of the micro-LED of the corresponding sub-pixel in serial; or each repair switch is electrically connected between the low potential terminal of the system power and a cathode of the micro-LED of the corresponding sub-pixel.

* * * * *